United States Patent
Choi et al.

(10) Patent No.: US 8,004,646 B2
(45) Date of Patent: Aug. 23, 2011

(54) REFLECTIVE LIQUID CRYSTAL DISPLAY AND MANUFACTURING METHOD OF THE SAME

(75) Inventors: Nak-Cho Choi, Seoul (KR); Fusayuki Takeshita, Seoul (KR)

(73) Assignee: Samsung Electronics Co., Ltd. (KR)

( * ) Notice: Subject to any disclaimer, the term of this patent is extended or adjusted under 35 U.S.C. 154(b) by 245 days.

(21) Appl. No.: 12/422,220

(22) Filed: Apr. 10, 2009

(65) Prior Publication Data

US 2010/0097547 A1    Apr. 22, 2010

(30) Foreign Application Priority Data

Oct. 21, 2008   (KR) .................. 10-2008-0102971

(51) Int. Cl.
*G02F 1/1341* (2006.01)
(52) U.S. Cl. .......... 349/153; 349/73; 349/156; 349/176; 349/190
(58) Field of Classification Search .................. None
See application file for complete search history.

(56) References Cited

U.S. PATENT DOCUMENTS

| | | | |
|---|---|---|---|
| 4,389,095 A * | 6/1983 | Teshima et al. | 349/144 |
| 6,285,434 B1 * | 9/2001 | Ma et al. | 349/189 |
| 7,864,285 B2 * | 1/2011 | Liao et al. | 349/156 |
| 2005/0073491 A1 * | 4/2005 | Mi | 345/89 |
| 2005/0099575 A1 | 5/2005 | Liang | |
| 2006/0176257 A1 | 8/2006 | Wang et al. | |
| 2007/0285611 A1 | 12/2007 | Nose et al. | |

FOREIGN PATENT DOCUMENTS

| | | | |
|---|---|---|---|
| JP | 2000-267120 A | * | 9/2000 |
| JP | 2001-305551 A | | 10/2001 |
| JP | 2003-131267 A | | 5/2003 |
| JP | 2005-148480 A | | 6/2005 |
| JP | 2006-293393 A | | 10/2006 |
| JP | 2007-072419 A | | 3/2007 |
| KR | 10-2002-0054937 A | | 7/2002 |
| KR | 10-2004-0044587 A | | 5/2004 |
| KR | 10-0453897 B1 | | 10/2004 |
| KR | 10-2007-0053768 A | | 5/2007 |

* cited by examiner

*Primary Examiner* — Mike Stahl
(74) *Attorney, Agent, or Firm* — Innovation Counsel LLP

(57) ABSTRACT

A reflective liquid crystal display that comprises: a first substrate; a common electrode formed on the first substrate; a second substrate corresponding to the first substrate; a pixel electrode formed on the second substrate; partitions formed between the common electrode and the pixel electrode; red, green, and blue cholesteric liquid crystals formed in regions separated by the partitions; and sealing lines formed on the outer peripheries of the partitions and having three liquid crystal injection holes.

19 Claims, 8 Drawing Sheets

FIG.11

REFLECTIVE LIQUID CRYSTAL DISPLAY AND MANUFACTURING METHOD OF THE SAME

CROSS-REFERENCE TO RELATED APPLICATION

This application claims priority to and the benefit of Korean Patent Application No. 10-2008-0102971 filed in the Korean Intellectual Property Office on Oct. 21, 2008, the entire content of which is incorporated herein by reference.

BACKGROUND (a) Field

The present disclosure relates to a reflective liquid crystal display, and more particularly to a cholesteric liquid crystal display in which cholesteric liquid crystals for red R, green G, and blue B are provided in a liquid crystal panel, and a manufacturing method of the same.

(b) Description of the Related Art

In general, a cholesteric liquid crystal display is a reflective liquid crystal display having low power consumption and providing high luminance on a screen. The cholesteric liquid crystals are mixed with chiral dopants to have a helical structure and selectively reflect light having the same wavelength as the helical pitch of the liquid crystal, thereby controlling light transmittance for each pixel.

For example, when the helical length of the liquid crystal is 550 nm, the liquid crystal reflects green light to display a single color. Therefore, the cholesteric liquid crystal display basically requires three types of cholesteric liquid crystals having the same helical pitch as the wavelengths of green, blue, and red light, in order to implement a full-color image (for example, the wavelength of red light is 650 nm and the wavelength of blue light is 450 nm).

As described above, a color liquid crystal display that is provided with three types of cholesteric liquid crystals uses a three-stack system in which three liquid crystal panels injected with cholesteric liquid crystals for blue B, red R, and green G, are vertically superimposed and attached to each other in an early stage. In recent years, a one-panel system has been researched in which partitions are formed inside one liquid crystal panel and three types of cholesteric liquid crystals for blue B, red R, and green G, are injected into spaces separated by the partitions.

The one-panel system uses an inkjet process in which ink is deposited between the partitions. In the one-panel system, when a color filter is formed by the inkjet process, various failures such as peripheral spot failures are generated when the liquid crystals become hard, after the liquid crystals are deposited.

SUMMARY OF THE INVENTION

An exemplary embodiment of the present invention provides a reflective liquid crystal display and a manufacturing method of the same, enabling the advantage of implementing high resolution by easily injecting different kinds of cholesteric liquid crystals into one liquid crystal panel through the simple change of an injection hole of the liquid crystal, without additional equipment.

An exemplary embodiment of the present invention provides a reflective liquid crystal display that comprises: a first substrate; a common electrode formed on the first substrate; a second substrate corresponding to the first substrate; a pixel electrode formed on the second substrate; partitions formed between the common electrode and the pixel electrode; such partitions defining three distinctly separated regions or cells; blue B, red R, and green G, cholesteric liquid crystals that are formed in the cells, such partitions further comprising a transversal segments extending in a first direction, and longitudinal segments extending in a second direction that is substantially orthogonal to the first direction; and sealing lines that are formed on the outer peripheries of the partitions and have three liquid crystal injection holes.

In one embodiment of the present invention, the partitions between the common electrode and the pixel electrode are formed using a photosensitive organic material.

In yet another embodiment of the present invention, a thin-film-transistor (TFT) is formed on the second substrate of the reflective liquid crystal display in order to control the transmittance of the light reflected by the cholesteric liquid crystal.

Another embodiment of the present invention provides a manufacturing method of a reflective liquid crystal display that comprises forming a common electrode on a first substrate; forming a pixel electrode on a second substrate; forming partitions between the common electrode and the pixel electrode, such partitions further comprising transversal segments extending in a first direction, and longitudinal segments extending in a second direction that is substantially orthogonal to the first direction; injecting cholesteric liquid crystals into the regions separated by the partitions through the injection holes provided; and sealing each of the three liquid crystal injection holes formed on the outer peripheries of the partitions.

According to an exemplary embodiment of the present invention, it is possible to effectively prevent liquid crystals that display different colors from being mixed with each other, and it is possible to easily inject different kinds of liquid crystal materials, separately, into one liquid crystal panel having partitions.

In another embodiment of the present invention, the end seals for each of the liquid crystal injection holes are formed separately.

Accordingly, it is possible to easily manufacture a one-panel color liquid crystal display without a complicated process that has a high failure probability, such as an inkjet process. The present invention also provides the advantage that a high-resolution display can be manufactured.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

An exemplary embodiment of the present invention will hereinafter be described in detail with reference to the accompanying drawings.

Figure 1:
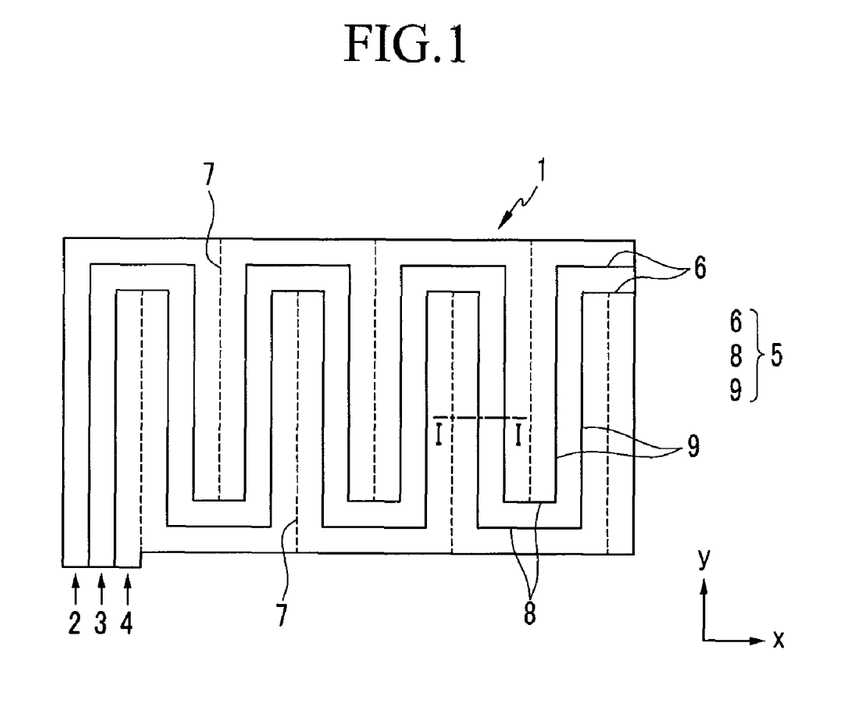
FIG. 1 is a plan view of a partition of a liquid crystal panel according to an exemplary embodiment of the present invention.
Figure 2:
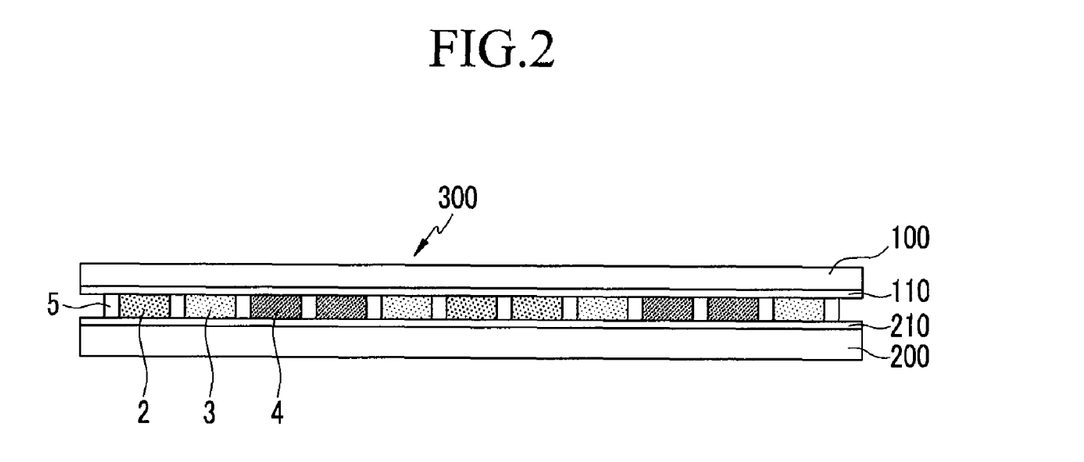
FIG. 2 is a cross-sectional view of a liquid crystal panel according to an exemplary embodiment of the present invention.
Figure 3:
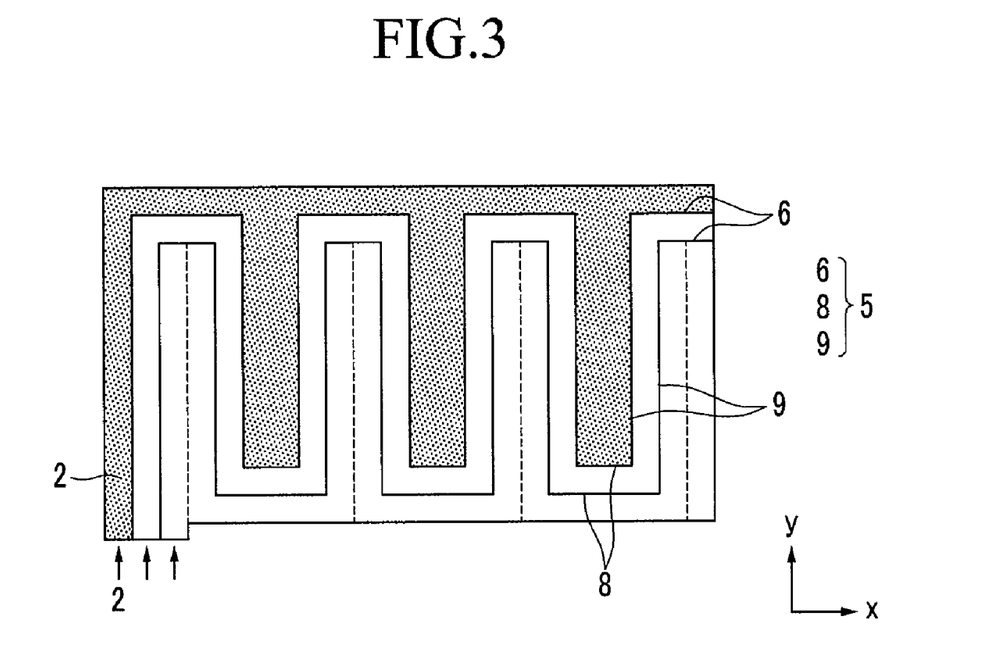
FIG. 3 is a plan view of a state in which a cholesteric liquid crystal for blue color is injected into a region separated by the partition shown in FIG. 1, through a first injection hole.
Figure 4:
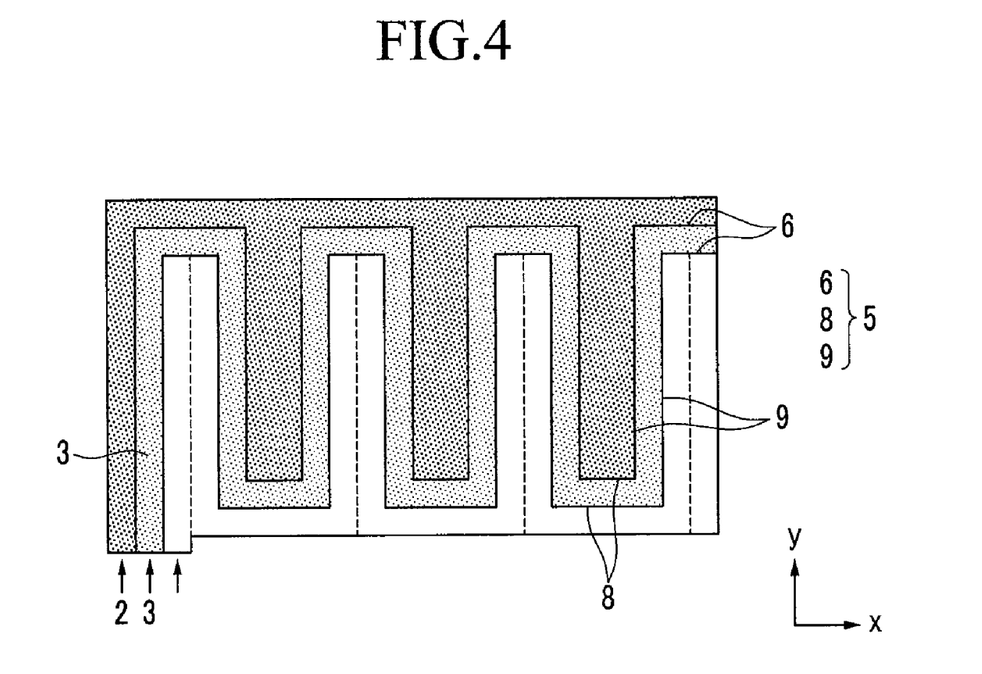
FIG. 4 is a plan view of a state in which a cholesteric liquid crystal for red color is injected into the region separated by the partition shown in FIG. 1, through a second injection hole.
Figure 5:
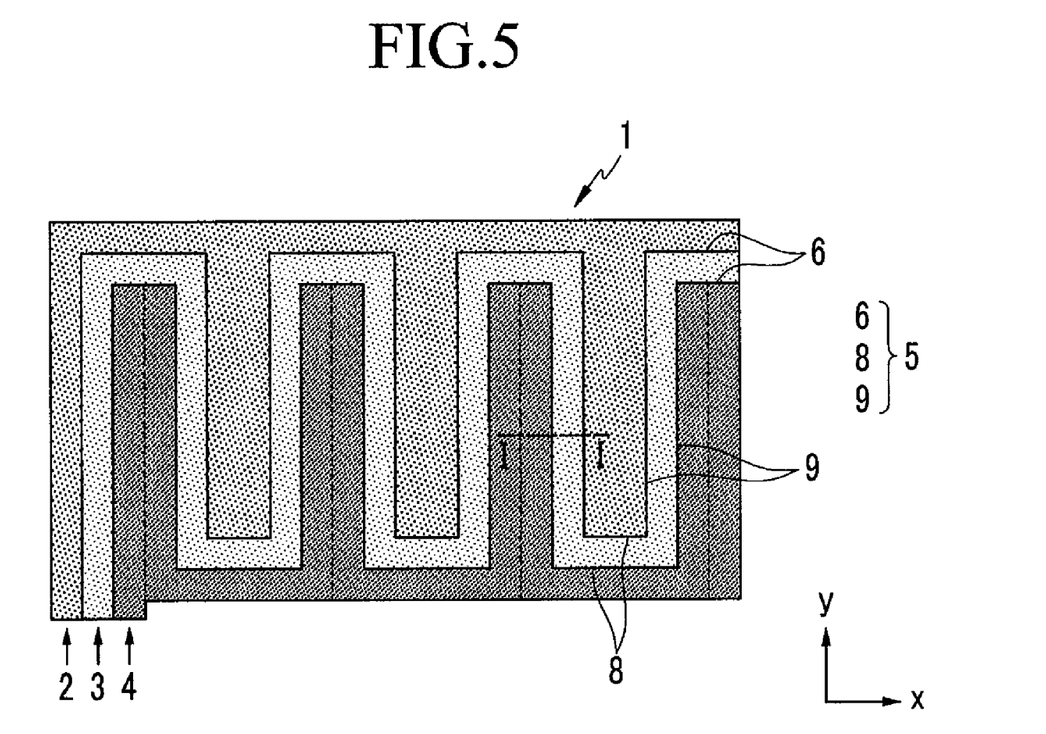
FIG. 5 is a plan view of a state in which a cholesteric liquid crystal for green color is injected into the region separated by the partition shown in FIG. 1, through a third injection hole.

FIG. 1 is a plan view of red R, green G, and blue B partitions of a raw panel for a liquid crystal display according to an exemplary embodiment of the present invention, FIG. 2 is a cross-sectional view of a liquid crystal panel according to an exemplary embodiment of the present invention, and FIGS. 3 to 5 are plan views illustrating a sequence and a state in which different kinds of liquid crystals having colors of R, G, and B of FIG. 1 are sequentially injected.

Figure 6:
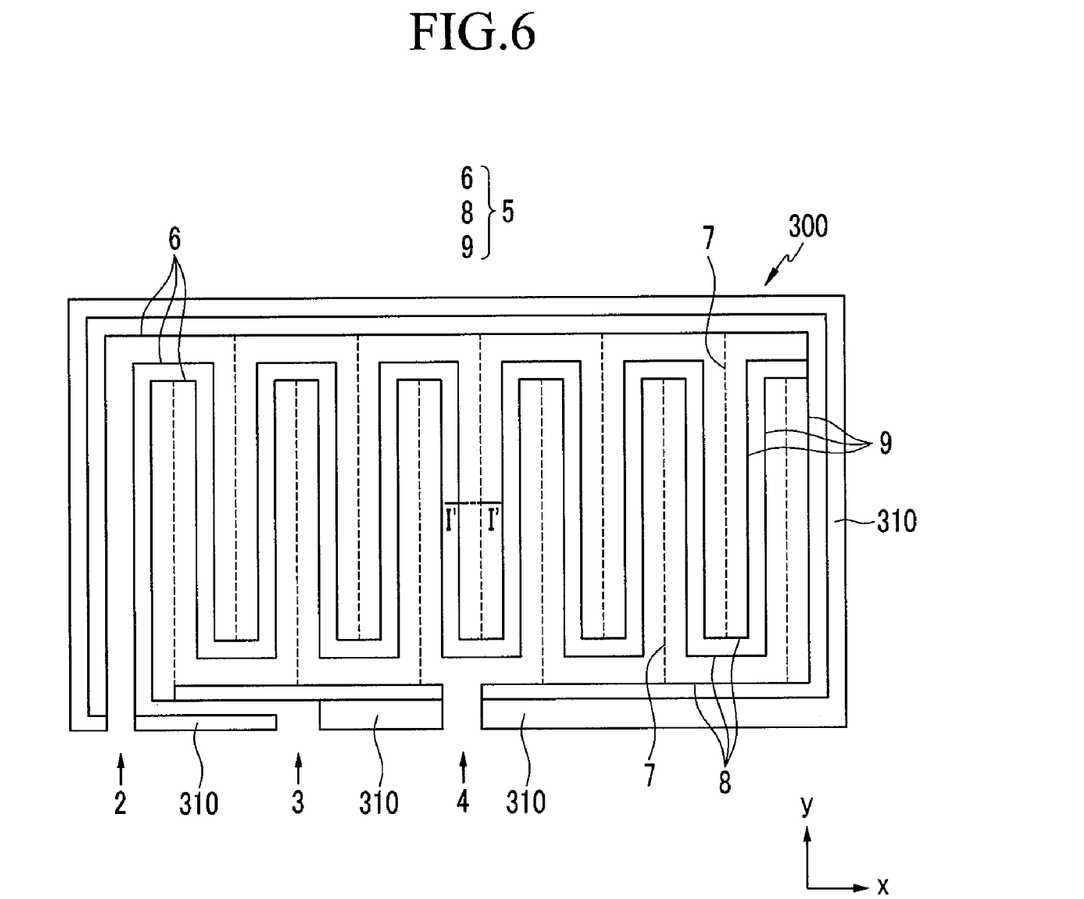
FIG. 6 is a plan view of a liquid crystal panel including a sealing line formed on the outer periphery of the partition of FIG. 1 according to another embodiment of the present invention.
Figure 7:
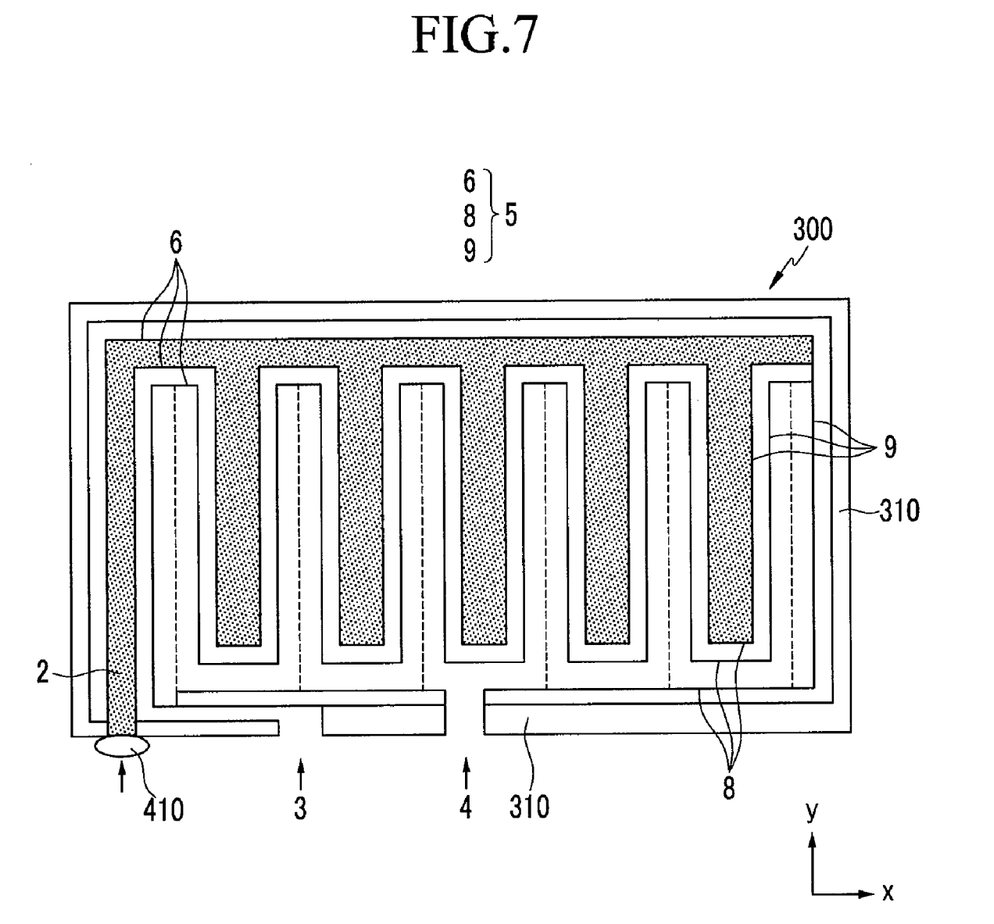
FIG. 7 is a plan view of an end-seal state after the cholesteric liquid crystal for blue color is injected into the region separated by the partition shown in FIG. 6, through a first injection hole.
Figure 8:
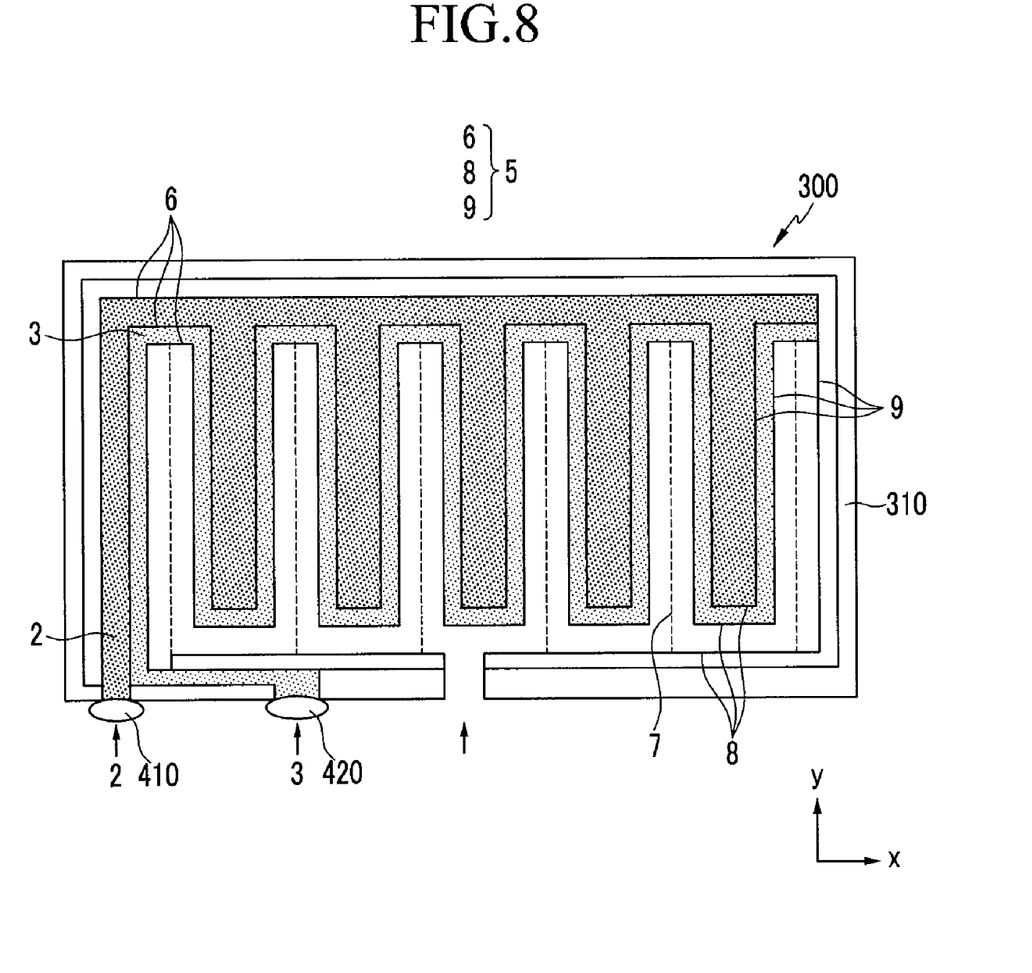
FIG. 8 is a plan view of an end-seal state after the cholesteric liquid crystal for red color is injected into the region separated by the partition shown in FIG. 6, through the second injection hole.
Figure 9:
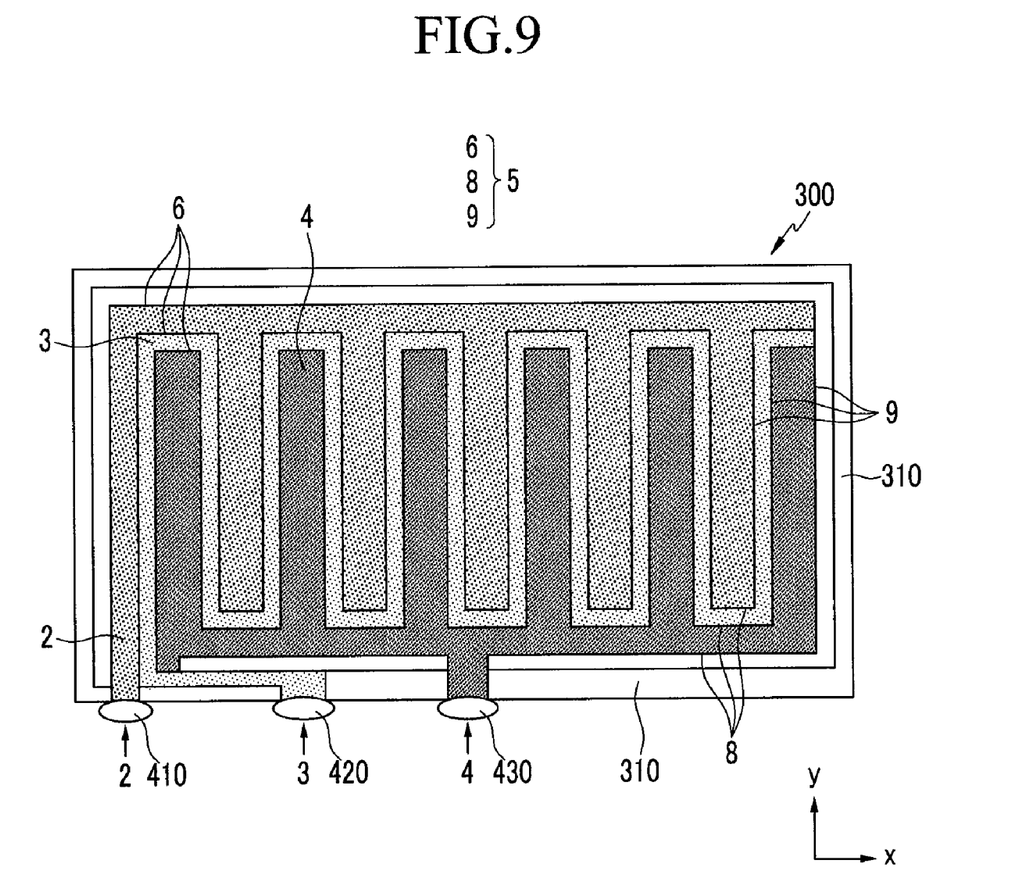
FIG. 9 is a plan view of an end-seal state after the cholesteric liquid crystal for green color is injected into the region separated by the partition shown in FIG. 6, through the third injection hole.

FIG. 6 is a plan view of a liquid crystal panel including a sealing line formed outside of an outer periphery of the partition of FIG. 1 according to another embodiment of the present invention, and FIGS. 7 to 9 are plan views illustrating a sequence and a state in which different kinds of liquid crystals having colors of R, G, and B are sequentially injected through injection holes. The injection holes are spaced from each other by a predetermined gap by a sealing line for each color, unlike in FIG. 1.

Figure 10:
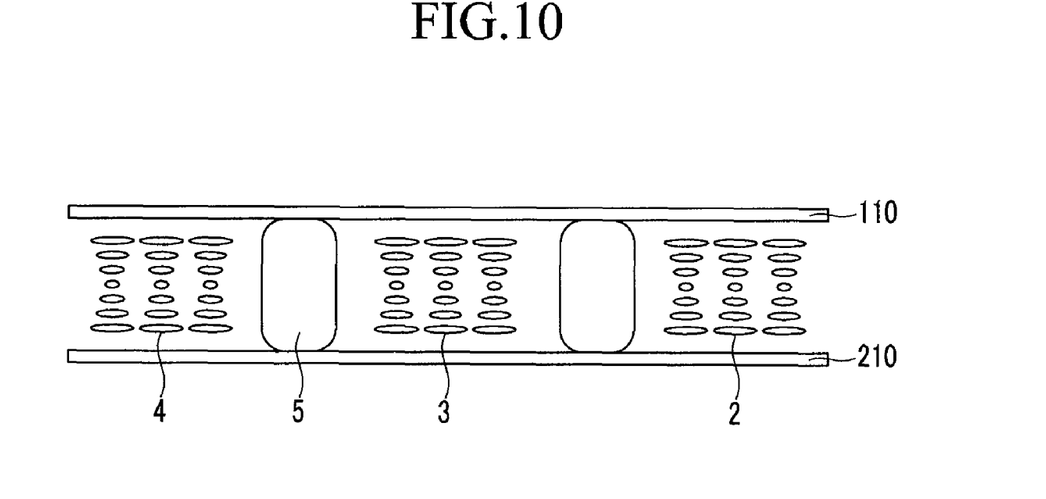
FIG. 10 is a cross-sectional view from a top transparent electrode to a bottom transparent electrode, taken along line I-I shown in FIGS. 1 and 5.

FIG. 10 is a cross-sectional view of an exemplary embodiment of the present invention from an upper transparent electrode to a lower transparent electrode taken along line I-I shown in FIGS. 1 and 5.

Figure 11:
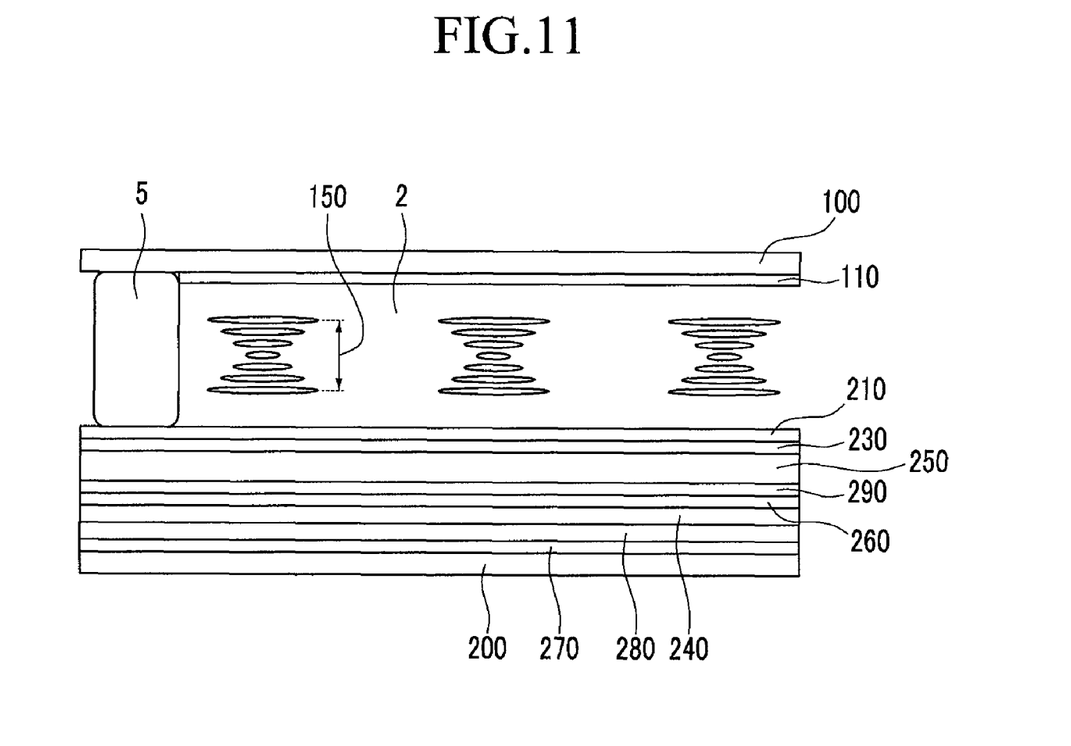
FIG. 11 is a cross-sectional view from a top substrate to a bottom substrate, taken along line I'-I' shown in FIG. 6.

FIG. 11 is a cross-sectional view of an exemplary embodiment of the present invention from an upper substrate to a lower substrate taken along line I'-I' shown in FIGS. 6 and 7.

Hereinafter, an exemplary embodiment of the present invention will be described with reference to the accompanying drawings.

FIG. 1 is a plan view of partitions 5 into which three types of color cholesteric liquid crystals 2, 3, and 4 are injected in a panel 1. In one embodiment of the present invention, the liquid crystals corresponding to reference numerals 2, 3 and 4 are blue B, red R, and green G, respectively. The panel 1, in FIG. 1, defines two perpendicular directions, X and Y, shown in FIG. 1 and FIGS. 3-9. Hereinafter, the X-direction as shown in FIG. 1, and FIGS. 3-9, will be associated with a "left-right" direction, and the Y direction in FIG. 1, and FIGS. 3-9, will be associated with an "up-down" direction.

FIG. 2 is a cross-sectional view of an entire raw panel 300 including the panel shown in FIG. 1. Herein, the raw panel 300 comprises a first, top substrate 100, having a first electrode 110 for driving liquid crystals, and partitions 5 that are arranged on the first substrate 100 in a stripe pattern, separating a plurality of liquid crystal cells 2, 3, and 4. In one embodiment of the invention, the liquid crystal cells 2, 3 and 4 correspond to blue B, red R and green G cells, respectively. A second, bottom substrate 200, in FIG. 2 has a second electrode 210 for driving the liquid crystals and is integrally joined to the first substrate 100 with the partitions 5 interposed therebetween. FIGS. 3 and 4 illustrate one example of the partitions 5. The partitions 5 are arranged in a stripe pattern, with the stripes having longitudinal segments 6 and 8, and transversal segments 9. The longitudinal segments 6 and 8 are formed along the left-right direction (X axis in FIGS. 1, 3 and 4), at upper and lower end portions of the raw panel 1 (upper and lower portions defined relative to the Y-axis, as shown in FIGS. 1, 3 and 4). The transversal segments 9 are formed along the up-down direction of each of the first and second substrates 100 and 200 (Y-axis in FIGS. 1, 3 and 4). The longitudinal segments 6 and 8 connect some of the transversal segments 9 to each other, so that each kind of liquid crystal among the blue B, red R, and green G, colors is separately linked across the entire panel 1, forming a cell. Furthermore, any two different kinds of liquid crystals among the blue B, red R, and green G, colors are separated from each other by the partitions 5. Thus, partition spaces, or regions, also referred to as cells, are created into which three types of cholesteric liquid crystals for blue B, red R, and green G, colors are injected, without being mixed with each other.

The first and second electrodes 110 and 210 of FIG. 2 are formed on surfaces of the first (top) and second (bottom) substrates 100 and 200, respectively. In this manner, applying a voltage through the electrodes 110 and 210 will allow the cholesteric liquid crystals injected thereafter to be twisted in a pitch for each color.

In FIGS. 3 to 5, the blue B, red R, and green G, cholesteric liquid crystals are injected into the partitions shown in FIG. 1 in the order of blue B, red R, and green G. The colors can be placed in any desired order.

FIG. 6 is a plan view of the entire liquid crystal display panel 300, including sealing lines 310 formed at an outer periphery and at a lower end of each partition 5 that separates the blue B, red R, and green G, colors shown in FIG. 1, where the upper and lower end of each partition is defined relative to the Y-axis, as shown in FIG. 6.

Herein, an end seal is positioned at a lower end of the panel 300, and blue B, red R, and green G, color cells are separated from each other by a predetermined gap along the sealing line, from a left end of the panel 300, in the order of blue B, red R, and green G.

The liquid crystals are injected in the stripe pattern, or cell, for each color, with any two different colors separated from each other by the partitions 5. As shown in FIG. 9, the blue B, red R, and green G, colors are repeatedly formed in the order of B, R, G, G, R, B, B, R, and G, from left to right of the panel 300 (X-direction in FIG. 9). The partitions 5 comprise the longitudinal segments 6 and 8, located at the upper and lower ends of the panel 300, and the transversal segments 9, adjacent to each other. The longitudinal segments 6 and 8 are connected to the transversal segments 9 at the upper and lower end portions of the transversal segments 9. Dotted lines 7 in the blue and green regions shown in FIGS. 1, and 3-8, represent boundaries between pixels in a region where liquid crystals of the same color are successively filled. The liquid crystals are injected from "up" to "down", or from "down" to "up" along the regions or cells separated by the partitions 5, where the "up" and "down" direction is defined by the Y-axis in FIGS. 1 and 3-8.

Herein, FIG. 10 illustrates a cross-sectional view taken along line I-I, shown in FIGS. 1 and 5. In particular, the illustration along line I-I shows a cross-sectional view of the transparent electrodes formed on the top 100 and bottom 200 substrates. Also shown in FIG. 10, from left to right, is the second pixel of two successively arranged green pixels 4; next, a red pixel 3; and next, a first pixel of two successively arranged blue pixels 2. Separating the three types of liquid crystals, FIG. 10 illustrates one of the partitions 5, disposed between the electrodes.

FIG. 11 is a cross-sectional view of line I'-I' in FIG. 6, illustrating, from left to right, one of the partitions 5 and the blue pixels successively arranged next to the partition.

Gate wiring 270 and a gate insulating layer 280 are formed on the bottom substrate 200. A semiconductor layer 240 is formed on the gate insulating layer 280. Data wiring 260 including a data line, a source electrode, and a drain electrode is formed thereon. A passivation layer 290 and an absorber 250, forming a black matrix, are sequentially formed thereon. A capping film 230 such as the passivation layer is formed thereon, and the pixel electrode 210 is formed on the capping film. The pixel electrode 210 is made of a transparent conductive material such as Indium Titanium Oxide (ITO) or Indium Zinc Oxide (IZO). The gate wiring 270, gate insulating layer 280, data wiring 260, and semiconductor layer 240 form a thin film transistor that switches the pixel electrode 210.

As shown in FIG. 11, a liquid crystal 2 of the blue pixel separated by the partition of FIG. 5 is twisted differently depending on a driving voltage applied between the common electrode 110 formed on the top substrate 100 and the pixel electrode 210 formed on the bottom substrate 200. The liquid crystal 2 suitably reflects light for a liquid crystal pitch 150 of the blue pixel, to exhibit a blue color. Blue liquid crystals 2, red liquid crystals 3, and green liquid crystals 4, shown in FIG. 10, have different pitches, whereby they reflect light corresponding to each pitch among incident light, to display a color image. Non-reflected light is absorbed by the absorber 250 that is formed below the pixel electrode 210 of the bottom substrate 200.

In the raw panel 300, according to the embodiment, shown in FIGS. 6 to 9, outer peripheries of all partitions 5 forming the blue B, red R, and green G cells, are configured by the sealing lines 310. The sealing lines 310 of the blue B, red R, and green G cells, are opened before the liquid crystals are injected. Injection holes for three kinds of liquid crystals are separated from each other by a predetermined gap by the sealing lines 310.

A first injection hole, a second injection hole, and a third injection hole may have the same separation distance or different separation distances therebetween.

First, as shown in FIGS. 7 to 9, the first injection hole formed at a lower end of a first sealing line is immersed in blue-colored cholesteric liquid crystal, the second injection hole formed at a lower end of a second sealing line is immersed in red-colored cholesteric liquid crystal, and the third injection hole formed at a lower end of a third sealing line is immersed in green-colored cholesteric liquid crystal. At this point, the three kinds of liquid crystals 2, 3, and 4 are injected into their respective cells by a vacuum injection method or by a capillary phenomenon method. The injection process can take place for all colors at the same time, or at a predetermined time for each color.

As shown in FIGS. 7 to 9, after the blue B, red R, and green G liquid crystals are injected into their respective cells, a sealant such as one that is hardened by ultraviolet rays is input into an end-seal line. Thus, a first sealant 410 of the first injection hole, a second sealant 420 of the second injection hole, and a third sealant 430 of the third injection hole are hardened by irradiating ultraviolet rays thereto. The first, second, and third end seals are hardened in sequence or at the same time.

The partitions 5 that are formed among the three-color liquid crystals prevent the blue B, red R, and green G cholesteric liquid crystals 2, 3, and 4, from being mixed with each other. In one embodiment of the invention, the partitions 5 may be formed using a photosensitive organic material As described above, the liquid crystal panel is completed by separately injecting the blue B, red R, and green G, cholesteric liquid crystals 2, 3, and 4 into the raw panel. The color cholesteric liquid crystal display is completed by attaching a polarized plate (not illustrated) and a retardation film (not illustrated).

While this invention has been described in connection with what is presently considered to be practical exemplary embodiments, it is to be understood that the invention is not limited to the disclosed embodiments, but, on the contrary, is intended to cover various modifications and equivalent arrangements comprised within the spirit and scope of the appended claims.

What is claimed is:

1. A reflective liquid crystal display, comprising:
a first substrate;
a common electrode formed on the first substrate;
a second substrate corresponding to the first substrate;
a pixel electrode formed on the second substrate;
partitions formed between the common electrode and the pixel electrode,
the partitions separating three regions in the display;
cholesteric liquid crystals formed in the three regions separated by the partitions; and
sealing lines formed on outer peripheries of the partitions and having three liquid crystal injection holes,
wherein blue liquid crystals (B), red liquid crystals (R), and green liquid crystals (G) are arranged in an order of BRG-GRB-BRG-GRB across a center portion of the reflective liquid crystal display.

2. The reflective liquid crystal display of claim 1, wherein the partitions comprise a first part consisting of transversal segments extending in a first direction of a liquid crystal panel.

3. The reflective liquid crystal display of claim 2, wherein the partitions comprise a second part consisting of longitudinal segments extending in a second direction that is substantially orthogonal to the first direction; the longitudinal segments being positioned at upper and lower end portions of the liquid crystal panel and connecting the transversal segments of the first part to each other.

4. The reflective liquid crystal display of claim 3, wherein the partitions have an additional injection hole for each of the blue liquid crystals, the red liquid crystals, and the green liquid crystals.

5. The reflective liquid crystal display of claim 1 wherein the partitions are formed from a photosensitive organic material.

6. The reflective liquid crystal display of claim 1, wherein the sealing lines formed on the outer peripheries of the partitions extend to the three liquid crystal injection holes.

7. The reflective liquid crystal display of claim 6, wherein an end seal is formed in each of the three liquid crystal injection holes.

8. The reflective liquid crystal display of claim 1, further comprising a thin film transistor formed on the second substrate.

9. The reflective liquid crystal display of claim 8, further comprising an absorption plate that is formed on the thin film transistor and absorbs light.

10. A manufacturing method of a reflective liquid crystal display, the method comprising:
   forming a common electrode on a first substrate;
   forming a pixel electrode on a second substrate;
   forming partitions between the common electrode and the pixel electrode, wherein the partitions form three regions including a blue (B) region, a red (R) region, and a green (G) region that correspond to blue liquid crystals, red liquid crystals, and green liquid crystals, respectively;
   injecting cholesteric liquid crystals, through three liquid crystal injection holes respectively corresponding to the blue (B) region, the red (R) region, and the green (G) region, into each of the three regions separated by the partitions, wherein the blue (B) region, the red (R) region, and the green (G) region are arranged in an order of BRG-GRB-BRG-GRB across a center portion of the reflective liquid crystal display; and
   sealing each of the three liquid crystal injection holes.

11. The method of claim 10 wherein the partitions are formed using a photosensitive organic material.

12. The method of claim 10, wherein the partitions comprise a first part that is arranged in a stripe pattern extending in a first direction of a liquid crystal panel.

13. The method of claim 12, wherein the partitions comprise a second part that is formed parallel to an second direction and is positioned at upper and lower ends of the liquid crystal panel and the second part connects upper and lower end portions of the first part to each other.

14. The method of claim 10, further comprising forming sealing lines around outer peripheries of the partitions.

15. The method of claim 10, wherein the sealing each of the three liquid crystal injection holes comprises forming an end seal in each of the three liquid crystal injection holes.

16. The method of claim 15, wherein the end seal in each of the three liquid crystal injection holes is formed separately after the cholesteric liquid crystals are injected.

17. The method of claim 15 wherein the end seal in each of the three liquid crystal injection holes is formed simultaneously after the cholesteric liquid crystals are injected.

18. The method of claim 10, further comprising forming a thin film transistor on the second substrate.

19. The method of claim 18, further comprising forming an absorption plate that absorbs light, on the thin film transistor.

* * * * *